(12) United States Patent
Gohn et al.

(10) Patent No.: US 6,836,053 B2
(45) Date of Patent: Dec. 28, 2004

(54) ELECTRICAL MACHINE

(75) Inventors: Hermfred Gohn, Wehr (DE); Claudio Picech, Moeriken (CH); Ralf Rotzinger, Murg-Niederhof (DE); Alfred Ziegler, Lenzburg (DE)

(73) Assignee: Alstom Technology LTD, Baden (CH)

( * ) Notice: Subject to any disclaimer, the term of this patent is extended or adjusted under 35 U.S.C. 154(b) by 96 days.

(21) Appl. No.: 10/125,509

(22) Filed: Apr. 19, 2002

(65) Prior Publication Data

US 2002/0180305 A1 Dec. 5, 2002

(30) Foreign Application Priority Data

Apr. 23, 2001 (DE) .......................................... 101 19 989

(51) Int. Cl.$^7$ ................................................ H02K 3/46
(52) U.S. Cl. ........................................ 310/270; 310/64
(58) Field of Search ................................ 310/270, 260, 310/52–64

(56) References Cited

U.S. PATENT DOCUMENTS

| | | | | |
|---|---|---|---|---|
| 2,712,085 A | * | 6/1955 | Willyoung | 310/262 |
| 4,091,301 A | * | 5/1978 | Blank | 310/270 |
| 4,143,290 A | | 3/1979 | Mizukami et al. | 310/270 |
| 4,177,398 A | * | 12/1979 | Zagorodnaya et al. | 310/270 |
| 4,658,170 A | * | 4/1987 | Ueda | 310/214 |
| 4,967,465 A | * | 11/1990 | Frank | 29/598 |
| 6,605,886 B2 | * | 8/2003 | Laskaris | 310/270 |

FOREIGN PATENT DOCUMENTS

| | | |
|---|---|---|
| DE | 1146968 B | 4/1963 |
| DE | 2629574 | 1/1977 |
| DE | 19732949 | 4/2001 |
| GB | 820577 | 9/1959 |

OTHER PUBLICATIONS

Weigelt, K., "Konstruktionsmerkmale grosser Turbogeneratoren," ABB Technik (Jan. 1989).

Bergmann, W., *Werkstofftechnik*, pp. 255–259 (Carl Hanser Verlag, Munich, Germany, 1984).

* cited by examiner

*Primary Examiner*—Dang Le
(74) *Attorney, Agent, or Firm*—Cermak & Kenealy LLP; Adam J. Cermak

(57) ABSTRACT

The object of the invention is to provide improved protection for the insulation of the rotor end windings of electrical machines that is suitable in particular for electrical limit-rating machines. This is achieved by the rotor end bell (2) consisting of steel and the retaining ring liner sheet (10), spatially separating the end winding insulation (9) from the rotor end bell (2), consisting of titanium or a titanium alloy. Moreover, a lubricant (11) with a temperature stability of >300° C. is applied between the retaining ring liner sheet (10) and the rotor end bell (2).

13 Claims, 1 Drawing Sheet

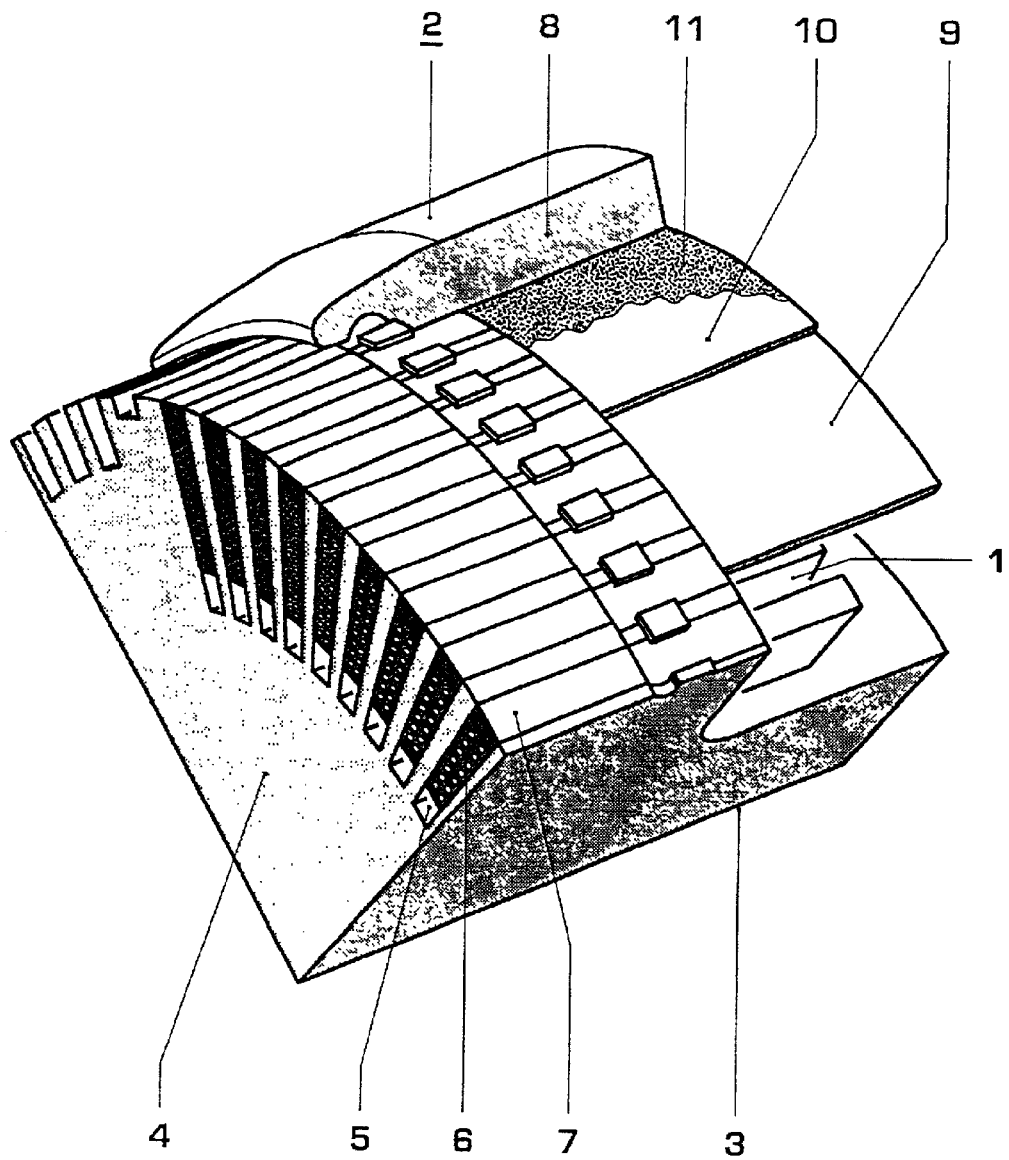
Fig.

ELECTRICAL MACHINE

TECHNICAL FIELD

The invention relates to the insulation of the rotor end windings of electrical machines.

PRIOR ART

Electrical machines such as generators or electric motors comprise a housing with a stator and a rotor and also in each case a stator winding and a rotor winding accommodated in corresponding slots. At each end of the rotor, the rotor windings form a rotor end winding. In the region of the rotor end windings, the rotors are provided with rotor end bells made of steel, which serve inter alia for fixing the axial end regions of the rotor windings to resist centrifugal forces. For assembly, the rotor end bells are placed axially onto the ends of the rotor body and shrink-fitted on there.

Such rotor end bells are subjected to great mechanical stress during the operation and overspeed testing of the electrical machine. In particular in the case of limit-rating machines, i.e. for machines in which the windings are of a considerable weight and the circumferential speeds are high, significantly greater loads are to be expected on account of the centrifugal force. However, high thermal and mechanical loads also already occur during assembly, mainly as a result of the shrink connection.

The rotor end bells are generally of a two-part form and comprise an axially arranged retaining ring and a radially directed retaining ring liner plate, as already known from DE 197 32 949 A1, which relates to a turbogenerator. In this case, the retaining ring and retaining ring liner plate may have both a screw connection and a shrink connection.

In the case of GB 820577, the insulating layers of the conductor bars of the rotor end winding are covered prior to the fitting of the rotor end bell by means of a non-magnetic retaining ring liner sheet serving for the mechanical protection of these insulating layers. For example, retaining ring liner sheets made of sheet steel or else sheet copper are used (K. Weigelt, "Konstruktionsmerkmale grosser Turogeneratoren" [design features of large turbogenerators] in ABB Technik 1/1989, page 13).

However, it has been found that, in particular for retaining ring liner sheets of limit-rating machines, the previously used materials are not suitable in the long term. Although steel has adequate strength, it has a high modulus of elasticity, i.e. high-strength alloys are necessary to allow appropriate adaptation to the expansion of the rotor end bell occurring during the operation of such a turbogenerator. One disadvantage of these high-strength steel alloys is the unfavorable pairing of materials in contact with the rotor end bell. By contrast, the elasticity of copper is adequate, but it is not strong enough to withstand the deformations of the rotor end bell occurring during the start-stop cycles. Aluminum, which has a very low modulus of elasticity and adequate strength, is not as well suited however for the temperatures in excess of 300° C. required for the shrink-fitting of the rotor end bell in the case of limit-rating machines. Other previously used materials, such as plastics for example, likewise do not have the properties required for limit-rating machines, such as temperature stability and mechanical elasticity, either.

SUMMARY OF THE INVENTION

The invention attempts to avoid all these disadvantages. It is based on the object of providing improved protection for the insulation of the rotor end winding of electrical machines that is suitable in particular for limit-rating machines.

According to the invention, this is achieved by the rotor end bell consisting of steel and the retaining ring liner sheet consisting of titanium or a titanium alloy. In principle, all commercially available titanium alloys are suitable for the production of the retaining ring liner sheet, TiAl6V4 being used in particular for reasons of cost and availability. Both titanium and titanium alloys have high strength, a low modulus of elasticity and a high temperature stability, so that they are particularly well-suited for use as the retaining ring liner sheet.

It is particularly advantageous for a lubricant with a temperature stability of >300° C. to be applied between the retaining ring liner sheet and the rotor end bell, with both the retaining ring liner sheet and the rotor end bell being suitable as a supporting material for the lubricant. The lubricant makes it easier for the rotor end bell to be pulled on and detached later, and also prevents sliding abrasion between the retaining ring liner sheet and the rotor end bell.

Finally, a lubricating varnish is advantageously applied as a lubricant, such as the molybdenum-containing lubricating varnish known by the trade name MOLYCOTE 3402, or a metal coating is used, such as for example plasma-sprayed copper or aluminum. In the latter case, a non-magnetic metal coating proves to be particularly advantageous, because this does not allow the abrasion products possibly occurring to be entrained into the magnetic field.

It is only by extensive friction-value tests for examining the behavior of the claimed pairings of materials that the suitability of the combination of a rotor end bell produced from steel with a retaining ring liner sheet made of titanium or a titanium alloy and the claimed lubricants has been demonstrated. Since they are, nevertheless, known materials and application methods, the costs involved in their use are relatively low.

BRIEF DESCRIPTION OF THE DRAWING

An exemplary embodiment of the invention is represented in the drawing on the basis of a rotor end winding of a turbogenerator. Only the elements essential for understanding the invention, and then only those at one axial end of the rotor, are shown. Not shown, for example, are the housing and the stator of the turbogenerator.

WAY OF IMPLEMENTING THE INVENTION

The single FIGURE shows in a perspective view one quarter of the rotor end winding 1 of a turbogenerator with a rotor end bell 2 made of steel shrink-fitted on this rotor end winding 1. The turbogenerator comprises a central rotor 4, which is mounted rotatably about an axis 3 and is concentrically surrounded by a stator (not shown). The rotor 4 and stator are accommodated in a housing (likewise not shown). The rotor 4 contains rotor windings 6, which are formed in corresponding slots 5 as conductor bars and are fastened by means of wedges 7. At each end of the rotor, a rotor end winding 1 is formed by the rotor windings 6. Said end winding is enclosed by a retaining ring 8 produced from steel, on which a retaining ring liner plate (not shown) is fitted at one end. In this case, the rotor end bell 2 is formed by the retaining ring 8 and the retaining ring liner plate.

In the region of the retaining ring 8, the rotor windings 6 are insulated from the rotor end bell 2 by means of an end winding insulation 9. Arranged between the end winding insulation 9 and the retaining ring 8 is a retaining ring liner sheet 10, which protects the end winding insulation both mechanically and thermally, in particular during the mounting (shrink-fitting) of the rotor end bell 2 and takes over the expansions of the retaining ring 8 occurring when there are load changes during the operation of the turbogenerator.

For this purpose, the retaining ring liner sheet 10 consists of titanium, with commercially available titanium alloys, such as TiAl6V4 for example, also being suitable. In the present exemplary embodiment, the retaining ring liner sheet is a single sheet rolled over the periphery of the end winding insulation 9, which however may likewise be divided into a plurality of sheet segments. In addition, a lubricant 11 is applied to the retaining ring liner sheet 10, making it easier for the rotor end bell 2 to be pulled on and detached and also preventing sliding abrasion between the retaining ring liner sheet 10 and the rotor end bell 2. A lubricating varnish, for example the molybdenum-containing sliding varnish known by the trade name MOLYCOTE 3402, is used as the lubricant, being applied to the outer side of the retaining ring liner sheet 10. The lubricating varnish may, of course, also be applied to the inner side of the rotor end bell 2 instead of to the retaining ring liner sheet 10. Similarly, a coating with non-magnetic metals, such as copper or aluminum for example, which can be applied by means of plasma spraying, is also suitable for preventing sliding abrasion.

The invention is not restricted to applications in the case of turbogenerators, it can also be used advantageously in the case of other electrical machines, such as for example in the case of motors.

| List of reference numerals | |
|---|---|
| 1 | rotor end winding |
| 2 | rotor end bell |
| 3 | axis |
| 4 | rotor |
| 5 | slot |
| 6 | rotor winding, conductor bar |
| 7 | wedge |
| 8 | retaining ring |
| 9 | end winding insulation |
| 10 | retaining ring liner sheet |
| 11 | lubricant |

What is claimed is:

1. An electrical machine comprising:

a stator and a rotor;

rotor windings arranged in correspondingly formed slots of the rotor, which rotor windings form a rotor end winding at each end of the rotor, which rotor end windings are respectively enclosed by a rotor end bell, with at least one end winding insulation being applied between the rotor windings and the rotor end bell and spatially separated from the rotor end bell by a non-magnetic retaining ring liner sheet; and wherein the rotor end bell comprises steel and the retaining ring liner sheet comprises titanium or a titanium alloy.

2. The electrical machine as claimed in claim 1, further comprising:

a lubricant with a temperature stability of >300° C. between the retaining ring liner sheet and the rotor end bell.

3. The electrical machine as claimed in claim 2, wherein the lubricant is applied to the retaining ring liner sheet.

4. The electrical machine as claimed in claim 3, wherein the lubricant comprises a lubricating varnish.

5. The electrical machine as claimed in claim 3, wherein the lubricant comprises a metal coating.

6. The electrical machine as claimed in claim 5, wherein the metal coating is non-magnetic.

7. The electrical machine as claimed in claim 2, wherein the lubricant is applied to the rotor end bell.

8. The electrical machine as claimed in claim 7, wherein the lubricant comprises a lubricating varnish.

9. The electrical machine as claimed in claim 7, wherein the lubricant comprises a metal coating.

10. The electrical machine as claimed in claim 9, wherein the metal coating is non-magnetic.

11. The electrical machine as claimed in claim 2, wherein the lubricant comprises a lubricating varnish.

12. The electrical machine as claimed in claim 2, wherein the lubricant comprises a metal coating.

13. The electrical machine as claimed in claim 12, wherein the metal coating is non-magnetic.

* * * * *